INVENTORS
Ellery Snyder
John F. Emerson
BY
ATTORNEYS

INVENTORS
Ellery Snyder
John F. Emerson
BY
ATTORNEYS

United States Patent Office 2,825,229
Patented Mar. 4, 1958

2,825,229

GYRO ERECTION SYSTEM WITH THERMAL INTEGRATION

Ellery Snyder, New York, N. Y., and John F. Emerson, Hasbrouck Heights, N. J., assignors, by mesne assignments, to the United States of America as represented by the Secretary of the Navy Application July 20, 1955, Serial No. 523,399

6 Claims. (Cl. 74—5.47)

The present invention relates to vertical seeking reference systems and more particularly to vertical gyro erection systems specially adapted to shipboard use.

It is well known that a perfectly balanced freely mounted gyroscope maintains its spin axis parallel with its original position if the gyroscope support is moved in space by the rotation of the earth and/or the craft upon which the gyroscope may be mounted. In the usual vertical gyro erection system the gyro is slaved to a reference vertical in the form of a pendulum which functions to apply the required precessing forces to the gyroscope to maintain its spin axis vertical with respect to the earth. The vertical position of the gyro depends upon the pendulum remaining vertical at all times and in shipboard systems the verticality of this reference is maintained only if the pendulum is located at the ship's metacenter because if it is located at any distance from the metacenter it is subject to roll and pitch accelerations that tend to throw it off the true vertical. Such errors due to these accelerations are partially minimized by immersing the pendulum in fluid damping means such as oil of proper viscosity to provide approximately critical damping. However, such an arrangement can only damp out the natural high frequency and amplitude of the free pendulum and cannot eliminate the acceleration error completely.

In accordance with this invention the error remaining after fluid damping, being symmetrical about the ship's roll and pitch axes, is integrated and averaged out so that precessing forces are applied to the gyro only when its spin axis departs from the true vertical as represented by the average position of the pendulum. Also in accordance with the invention a circuit arrangement is provided to prevent the gyroscope from attempting to follow errors in sudden movements of the pendulum due to appreciable accelerating forces brought about by sudden turns or the like. This is accomplished by deslaving the gyro during appreciable turns such as, for example, turns which displace a pendulum from the vertical in excess of five degrees.

When the gyro system is first energized it automatically provides for electrical caging of the gyro before it is enslaved to the reference pendulum. Thus far, pendulum has been used in the singular and a single pendulum can be employed as the vertical reference for both the pitch and the roll axes. However, the use of two pendulums offers certain advantages in circuitry and the invention will be hereinafter described as employing a separate pendulum for each of the roll and pitch axes, respectively.

An object of the invention is to provide a gyro erecting system which when used on shipboard prevents the gyro from attempting to follow pendulum errors which are symmetrical about the ship's roll and pitch axes and accomplishing this without deslaving the gyro.

Another object of the invention is to provide automatic electrical caging for a suitable interval after the system is energized and prior to enslavement to the pendulums.

Still another object of the invention is to provide a circuit arrangement with which the operator can at will introduce caging for any interval desired.

Still another object of the invention is to provide means for preventing the gyroscope from following movements of the pendulums due to excessive acceleration and deceleration forces such as those produced by a change in course of the craft.

Various other objects and advantages of the invention will become apparent and the invention itself will be better understood from the following description when read in connection with the accompanying drawings in which a preferred specific embodiment has been set forth for purposes of illustration.

Figure 1:
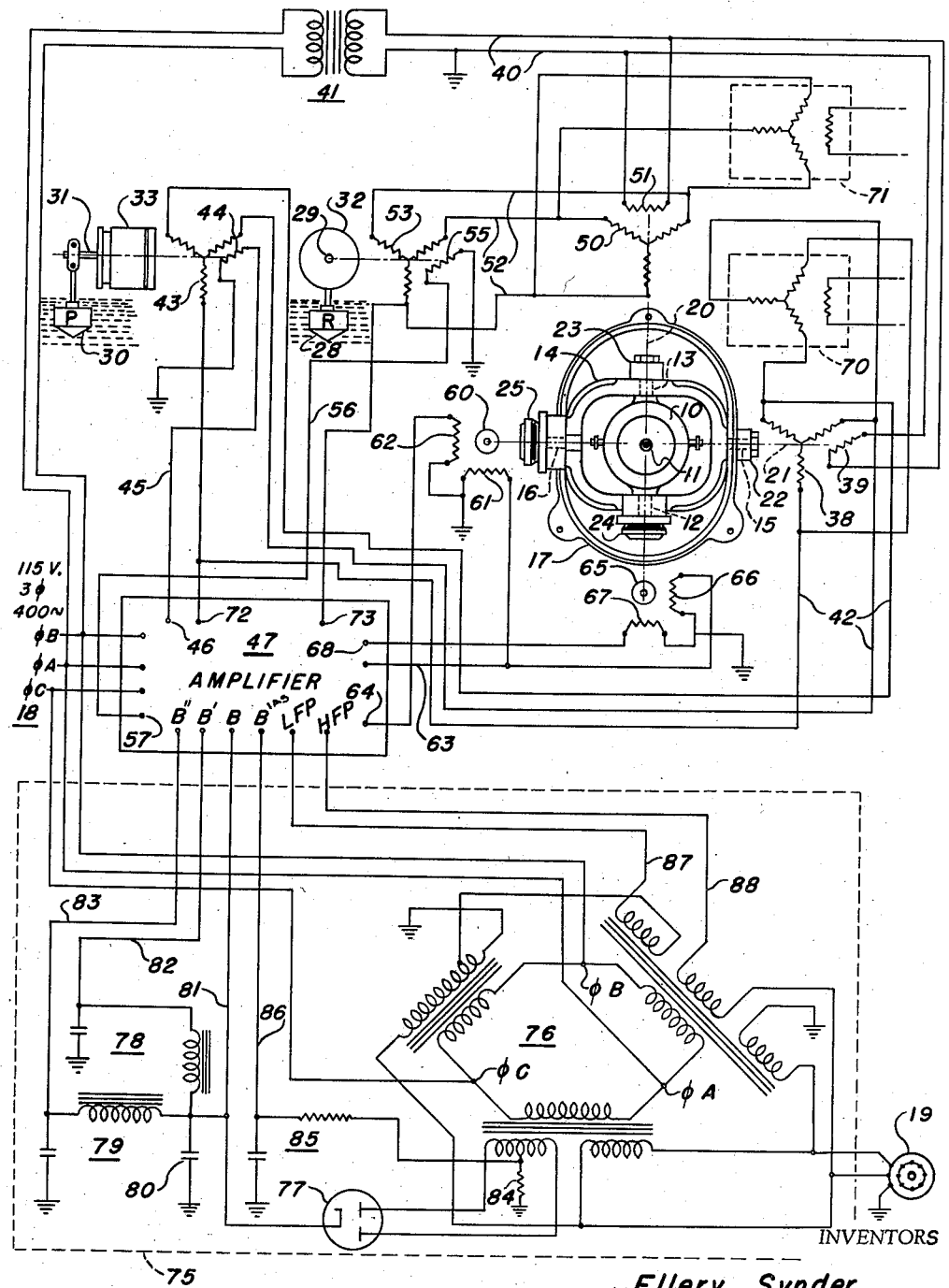
Fig. 1 is a schematic diagram of the complete erection system.

Referring to the schematic diagram of Fig. 1, a gyroscope housing 10, containing the usual gyroscope which is mounted to be rotated about a spin axis 11 by a motor 19, is mounted by trunnions 12 and 13 to rotate in a gimbal ring 14 which in turn is mounted by trunnions 15 and 16 to rotate in a frame 17 which is adapted to be secured to a support which is fixed with respect to the craft. The frame 17 is preferably mounted so that the axis 20 of the trunnions 12 and 13 is parallel to the forward-aft or roll axis of the craft while the axis 21 of the trunnions 15 and 16 is parallel to the transverse or pitch axis of the craft.

The trunnions 13 and 15 are connected to operate transmitting units 23 and 22 respectively of an alternating current self-synchronous transmission system, and the trunnions 12 and 16 are geared to torque motors 24 and 25, respectively. A pendulum 28 is pivotally mounted to swing about a shaft 29 the axis of which is parallel to the roll axis 20 and a pendulum 30 is pivotally mounted to swing about a shaft 31 the axis of which is parallel to the pitch axis 21. The shafts 29 and 31 control the rotors of units 32 and 33, respectively, of the transmission system. The pendulums 28 and 30 are preferably immersed in a liquid such as oil to damp out their natural high frequency oscillation.

The transmitter unit 22 is shown as comprising a Y connected stator winding 38 which remains fixed relative to the frame 17, and a rotor winding 39 which is mounted to turn with the trunnion 15 of the gimbal ring 14. The rotor winding 39 is shown as connected by lines 40 through a transformer 41 to be energized from phases A and B of a three phase 115 volt 400 cycle alternating current supply 18. The stator winding 38 is connected by lines 42 to a Y connected stator winding 43 of the transmission unit 33, rotor winding 44 of which is connected by a lead 45 to an input terminal 46 of an amplifier 47 to be described in connection with Fig. 2. The rotor winding 44 is mounted to turn with the shaft 31 as the pendulum 30 swings relative to the stator winding 43, which remains fixed relative to the frame 17 and its support. One of the lines 42 from the stator winding 38 is also connected to a terminal 72 in the amplifier 47.

The transmitter unit 23 comprises a stator winding 50 which remains fixed relative to the gimbal ring 14, and a rotor winding 51 which is mounted to be turned by the trunnion 13 in accordance with the movements relative to the ring 14 of the gyro-housing 10 about the axis 20. The stator winding 50 is connected by leads 52 to a stator winding 53 of the transmission unit 32. Rotor winding 55 of the unit 32 is connected by a lead 56 to an input terminal 57 of the amplifier 47 to be described. The rotor winding 51 is connected to the alternating current lines 40. One of the leads 52 from the stator winding 50 is also connected to a terminal 73 in the amplifier 47.

The electrical elements of the torque motor 25 comprise a squirrel cage induction rotor 60, which is mounted to apply a torque to the gimbal ring 14 about the axis 21, and a pair of field windings 61 and 62. The field winding 61 is connected between ground and a fixed phase alternating current line 63 leading from the amplifier 47, while the field winding 62 is connected between ground and the roll variable phase output terminal 64 of the amplifier 47. Similarly, the torque motor 24 comprises a squirrel cage induction rotor 65, which is mounted to apply a torque to the gyroscope housing 10 about the axis 20, and a pair of field windings 66 and 67, the winding 66 being connected between ground and the fixed phase line 63, and the winding 67 being connected between ground and the pitch variable phase output terminal 68 of the amplifier 47.

Instantaneous values of pitch and roll can be derived in signal form by synchro units 70 and 71 and transmitted to remote utilization devices of any desired type.

A power supply unit 75 comprises a power transformer 76 connected to be energized from the three phase supply lines 18 and having secondary windings from which are obtained the various currents and voltages required for the operation of the amplifier 47 as well as serving as an isolation transformer supplying three phase power for operating the gyro motor 19. A tube 77 operating as a full wave rectifier is connected to two filter sections 78 and 79 across an input condenser 80. A lead 81 connects the input end of the filters to a plate supply terminal B in the amplifier 47. The filter sections 78 and 79 are connected by leads 82 and 83 to two other plate supply terminals B' and B" in the amplifier 47. A resistance 84, connected between ground and the center tap of the supply winding for the rectifier tube 77, develops sufficient voltage for bias and is connected through an RC bias supply filter 85 and a lead 86 to the terminal BIAS in the amplifier 47.

Fixed phase voltages secured by adding voltages from phase AB and phase BC in such a manner as to secure voltages in phase quadrature with the reference phase AB supplied to the transformer 41 are connected by leads 87 and 88 to the terminals LFP and HFP, respectively, in the amplifier 47, the voltage on the lead 88 being higher than the voltage on the lead 87.

Figure 2:
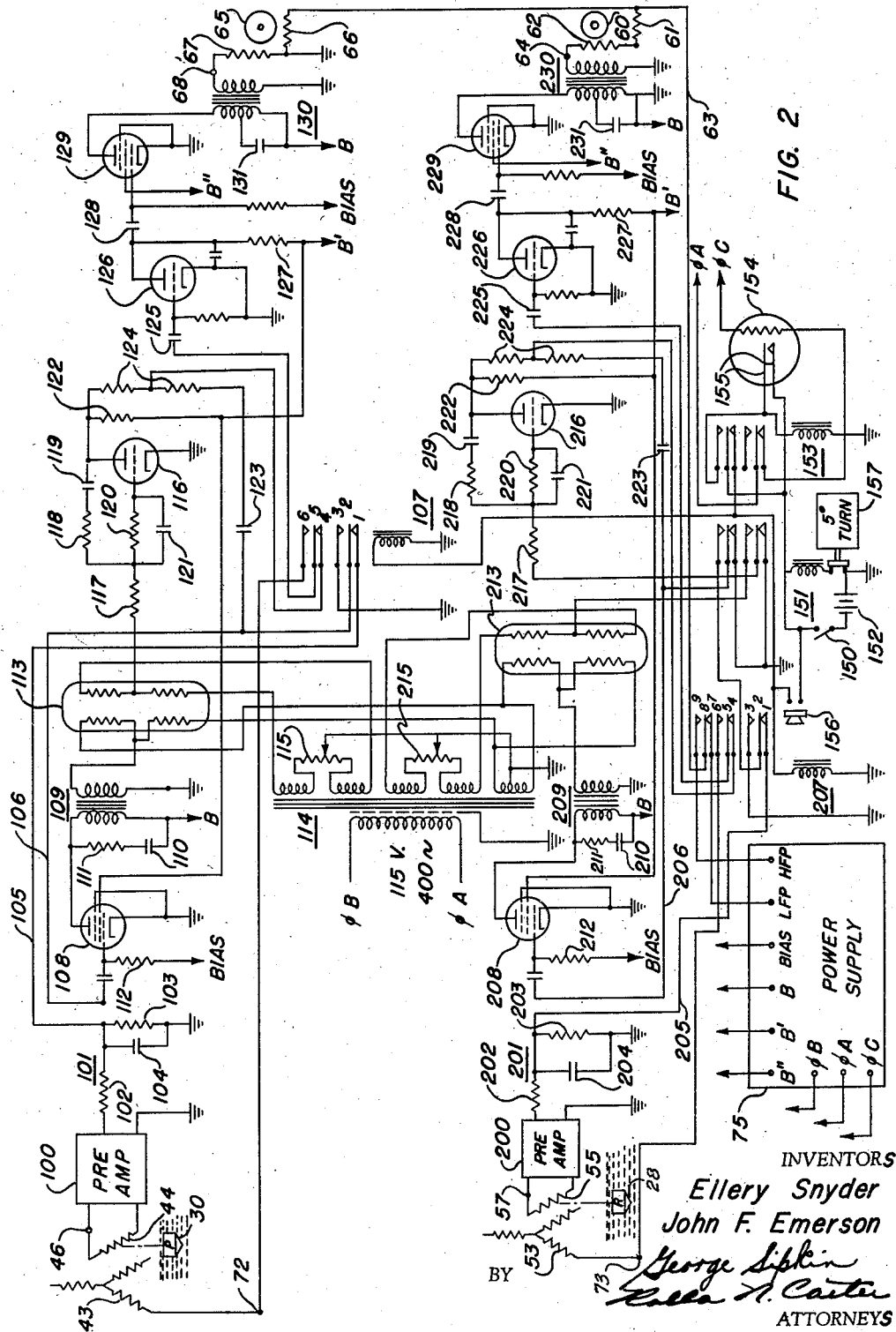
Fig. 2 is a circuit diagram of the gyro erection amplifier employed in the system of Fig. 1.

The amplifier 47 includes a two-channel gyro erection amplifier, a two-channel leveling preamplifier, and relay control and caging circuits and is shown schematically in Fig. 2 operatively associated with the above described erecting system. The pitch erection channel of the amplifier 47 has a preamplifier 100 through which the 400 cycle voltage appearing on the terminal 46 is fed to a network 101 consisting of two resistors 102 and 103 and a capacitor 104 connected so as to shift the phase of the input signal to bring it into phase with the reference phase AB and to attenuate the signal. The signal is then fed through leads 105 and 106 and contacts 1 and 2 of a relay 107 to the control grid of an amplifier tube 108 whose anode is connected to the primary winding of a transformer 109 which is tuned for zero phase shift by a capacitor 110 and loaded by a resistance 111. A resistor 112 couples the control grid of the tube 108 to the bias supply.

The output from the transformer 109 is used to control the heaters of a thermal time-delay tube 113 having a time constant of approximately one minute. The thermal resistors have high temperature coefficients and are connected in a "semi-bridge" circuit with a secondary winding of a transformer 114 whose primary winding is excited by the reference phase AB, the arrangement being such that when both of the thermal resistors in the tube 113 are at the same temperature the output is zero. In the absence of an output from the transformer 109 the resistors of the tube 113 are heated to the same temperature by current from the transformer 114 and balanced by an adjustable resistance 115. However, an output voltage from the transformer 109, which is in phase with the reference phase AB, will assist the heating of one of the heaters and oppose the heating of the other heater, the wiring being so arranged that an input signal into the transformer 109 results in an output from the tube 113 in phase with but lagging the initiating input.

The output from the delay tube 113 is fed into a resistance coupled triode 116 having a network consisting of resistors 117 and 118, and a condenser 119 to provide negative feedback. A resistor 120 by-passed by a condenser 121 furnishes bias to and a resistor 122 provides plate loading for the tube 116. At this point the input error signal to the amplifier tube 108 feeding through lead 106 and a condenser 123 is mixed with the output signal of the tube 116 in resistors 124 and the mixed signal passed through contacts 4 and 5 of the relay 107 and a coupling capacitor 125 to the grid of a resistance coupled amplifier tube 126. A resistor 127 loads the anode of the tube 126 and a capacitor 128 couples its output signal to a power amplifier pentode 129 whose anode is connected to the primary winding of an output transformer 130 which is tuned for zero phase shift by a condenser 131. The secondary winding of the transformer 130 feeds the variable phase winding 67 of the pitch torque motor 24 through the terminal 68 of the amplifier 47.

The roll erection channel of the amplifier 47 for energizing the variable phase winding 62 of the roll torque motor 25 in accordance with error signals appearing on the terminal 57 is identical with the pitch erection channel described above and the elements thereof have been given corresponding reference characters in the two hundred series. The circuit components of Fig. 2 not described above will appear in the following description of the operation of the system.

When the gyro erection system is first energized a switch 150 is also closed, by hand as here shown, to energize a relay 151 from a battery 152 which also energizes the relays 107 and 207 through the contacts of a relay 153 which is open, and the heater element of a thermal switch 154 is energized but its contacts 155 will not close until after a selected time interval, say one minute. In this initial condition, the relay 107 grounds the input to the amplifier tube 108, and connects the input of the amplifier tube 126 to the stator 38 of the gyro pitch takeoff synchro 22 through the terminal 72. At the same time, the relay 207 grounds the input to the amplifier tube 208 through contacts of the relay 151, connects the input of the amplifier tube 226 to the stator 50 of the gyro roll take-off synchro 23 through the terminal 73, and applies the high voltage of the terminal HFP to the fixed phase windings 61 and 66 of the gyro torque motors 25 and 24, respectively. Thus, fast caging is secured for the time interval after energization until the contacts 155 of the terminal relay 154 close, which interval is preferably of the order of one minute.

When the contacts 155 close they complete the circuit through the battery 152 and the coil of the relay 153 which locks itself, interrupts the circuit through the heater of the relay tube 154, and deenergizes the relays 107 and 207. The opening of the relays 107 and 207 restores the various amplifier inputs to their normal operating points and in addition the relay 207 switches the fixed phase windings 66 and 61 of the torque motors 24 and 25 from the terminal HFP to the terminal LFP to provide a lower voltage for normal operation.

An external switch 156 is provided for energizing the relays 107 and 207 at any time so that at the will of the operator electrical caging can be instituted and made to proceed for as long as the switch 156 is held in circuit closing position.

To prevent the gyro from attempting to follow the roll pendulum 28 when it is subjected to an acceleration force greater than a preselected value, such as a turn which displaces the pendulum out of vertical by more than five degrees, an acceleration responsive switch 157 is provided to interrupt the ground connection of the relay 151 to disable the roll erection channel of the amplifier 47 by grounding the inputs to the amplifier tubes 208 and 226. Normal operation of this channel is restored when the ship's turn is completed and the switch 157 recloses.

When after the initial caging interval the gyroscope has settled to positional agreement with the pendulum 30 no error signal appears on the terminal 46 and the transformer 109 has zero output. Therefore, the two heating elements in the delay tube 113 are at the same temperature, the thermal resistors are equally heated and the amplifier has no output signal at its terminal 68. Any relative angular displacement between the spin axis 11 of the gyro and the pendulum 30 about the pitch axis produces on the amplifier input terminal 46 an error signal which is a modulated 400 cycle voltage whose modulation amplitude is at all times proportional to the angular difference between the gyro pitch position with respect to the reference vertical established by the pitch pendulum 30. This signal after leveling in the preamplifier 100, is attenuated and phased by the network 101 to bring it into phase with the reference phase AB, and amplified in the tube 108 to appear as a corresponding output of the transformer 109. This output from the transformer 109 differentially affects the currents through the heater elements of the delay tube 113 so that they assume different temperatures and thus start to vary the temperature of the thermal resistors tending to make them unequal and if this error signal persists for a period of time longer than the delay interval of the tube 113 (here assumed to be one minute), as would be the case if the gyro's departure from vertical was caused by the rotation of the earth, the lack of balance between the thermal resistors of the tube 113 will provide an input to the amplifier tube 119 which will appear on the amplifier output terminal 68 as a variable phase signal which when applied to the variable phase winding 67 of the torque motor 24 will produce a torque in its rotor 65 which is proportional to the angular displacement of the gyroscope axis from the pendulum 30 and this torque will be applied in a direction to precess the gyroscope until its spin axis is restored to positional agreement with the pendulum 30 whereupon the rotor windings 39 and 44 will again be in synchronous position and no voltage will be produced in the rotor winding 44 and no signal is present on the amplifier input terminal 46. Had the modulated signal from the rotor winding 44 lasted for a period of time considerably less than the time constant of the tube 113 the modulation of the output of the tube 113 will be essentially the integration of the input signal modulation and when successive modulation signals are symmetrical about the pitch axis they are effectively averaged out by such integration and the erector system does not attempt to follow such symmetrical errors.

The same argument applies to the operation of the roll axis channel and the erector system does not follow short term symmetrical errors about the roll axis but does function to precess the gyroscope to maintain it in positional agreement with the average reference position established by the pendulum 28.

It will be evident from the above description that the present invention provides a gyro vertical reference system in which the takeoff synchro circuit provides electrical caging which is automatic for a selected time interval when the system is first energized and optional thereafter, a system in which the roll amplifier channel is automatically interrupted during turns of predetermined magnitude, and a system in which short-time errors, such as pitch and roll, symmetrical about the roll and pitch axes are integrated or averaged out within the amplifier so that although the rotor signals of the control transformers indicate the instantaneous differences in angular position between the respective pendulums and the gyro spin axis these signals do not affect the torque motors. Accordingly, the arrangement of the present invention is admirably suited for use on marine vessels.

While for the purpose of disclosing the invention a specific embodiment thereof has been described in detail it is to be understood that the invention is not limited thereto but contemplates those variations and modifications which will occur to one skilled in the art after having the benefit of the present disclosure, and all such variations and modifications are intended to be included within the scope of the appended claims.

We claim:

1. In a gyro erecting apparatus for use on marine craft subject to roll about an axis parallel to the fore and aft line of the craft, a gyroscope having a spin axis, a pendulum constrained to swing about an axis parallel to the roll axis, an electrical synchro and torque motor system having a synchronous position in which the spin axis of the gyroscope and the pendulum are parallel to a plane containing the roll axis and being operative to precess the gyroscope toward the synchronous position upon departure therefrom, characterized by said synchro and motor system having an amplifier whose ergodic includes a heat transfer phase the inherent time delay of which is appreciably longer than the period of a complete roll cycle, whereby symmetrical errors within such a period which are sensed by the synchro are integrated and effectively cancelled before they reach the torque motor.

2. The apparatus according to claim 1 including means responsive to an acceleration force whose component normal to said roll axis exceeds a preselected value for rendering said synchro and motor system ineffective during the persistence of such excess force.

3. The apparatus according to claim 1 wherein the electrical synchro and torque motor system includes a generator-control transformer assembly with stator windings and a rotor secondary and having the output from its rotor secondary applied to the input of the amplifier, further characterized by a switching arrangement operable at will to disconnect said secondary output from the amplifier input and to connect a stator winding to the amplifier at a point beyond its heat transfer phase, whereby electrical caging of the gyroscope occurs.

4. In a gyro erecting system in which a synchro-generator and control transformer unit translates the lack of positional agreement between the spin axis of a gyro and a pendulum-established reference axis into corrective precessive movement of the gyro through a torque motor having two phase windings, a first circuit for energizing the system with a stator winding of the synchro-generator connected to excite one of the phase windings of the torque motor and a first fixed phase voltage source connected to excite the other phase winding of the torque motor, a second circuit for energizing the system with the rotor winding of the control transformer connected to excite said one phase winding of the torque motor and a second fixed phase voltage source connected to excite the other phase winding of the torque motor, said first fixed phase source being at a voltage higher than the voltage of said second fixed phase source, and means operable upon the establishment of the first circuit for measuring a time interval and thereafter to disestablish the first circuit and establish the second circuit, whereby the gyro is rapidly caged for an initial interval of time.

5. The system according to claim 4 including acceleration responsive means operable to interrupt in said second circuit the connection between the rotor winding of the control transformer and said one phase winding of the torque motor when subjected to an acceleration force in excess of a preselected value, thereby deslaving the system during the existence of conditions which would otherwise introduce substantial error in the reference axis.

6. In a gyro erecting system for use on marine craft and in which the reference axes are represented by two pendulums having mutually perpendicular swing axes and immersed in a liquid for damping out natural high frequency oscillations of the pendulums, a gyroscope mounted for movement about axes parallel, respectively, to the pitch and roll axes of the craft and the swing axes of the pendulums, means for establishing separate electric signals corresponding to the angular displacements between the spin axis of the gyroscope and their respective references axes, means for individually integrating the electric signals with respect to a time interval slightly longer than the periods of the pitch and roll cycles, respectively, of the craft, whereby errors in the verticality of the reference axes due to symmetrical pitch and roll accelerations are averaged out, and means responsive to the integrated signals for precessing the gyroscope.

References Cited in the file of this patent

UNITED STATES PATENTS

| | | |
|---|---|---|
| 2,531,826 | Reichel | Nov. 28, 1950 |
| 2,567,948 | Lane | Sept. 18, 1951 |
| 2,589,874 | Seliger | Mar. 18, 1952 |

FOREIGN PATENTS

| | | |
|---|---|---|
| 612,608 | Great Britain | Nov. 16, 1948 |